(No Model.)
G. ZILLGITT.
BICYCLE.
No. 471,249. Patented Mar. 22, 1892.
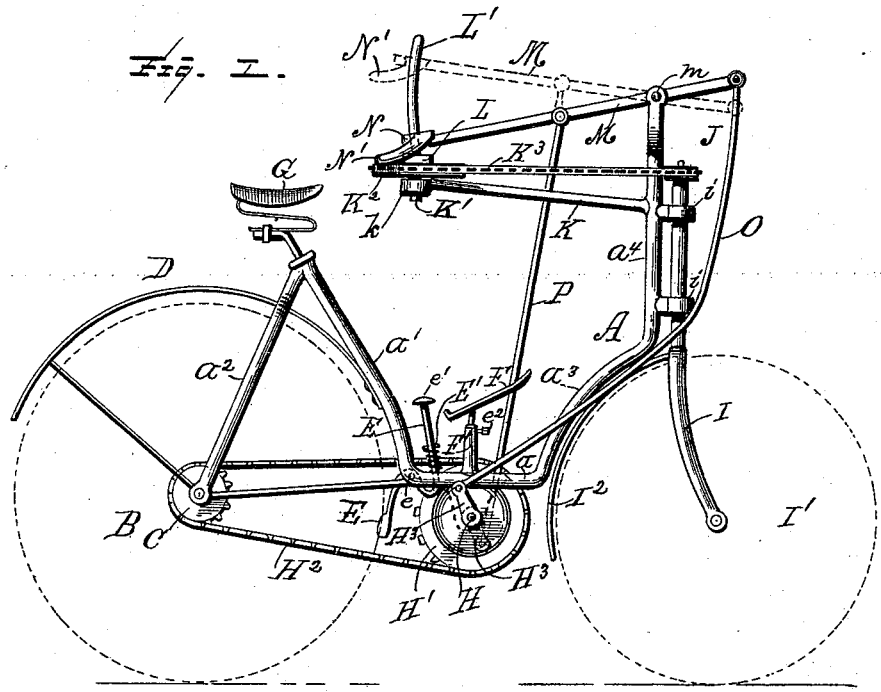
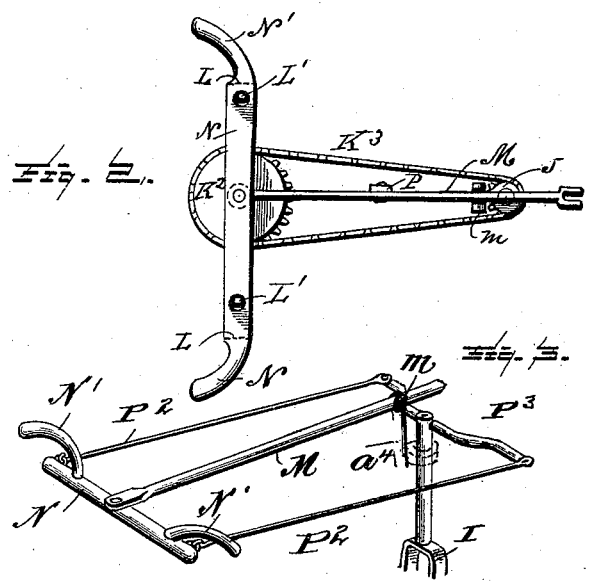
Witnesses
L. C. Hills.
E. H. Bond.
Inventor
Gustav Zillgitt.
by E. B. Stocking
Attorney

UNITED STATES PATENT OFFICE.

GUSTAV ZILLGITT, OF LUDINGTON, MICHIGAN.

BICYCLE.

SPECIFICATION forming part of Letters Patent No. 471,249, dated March 22, 1892.

Application filed September 25, 1891. Serial No. 406,821. (No model.)

*To all whom it may concern:*

Be it known that I, GUSTAV ZILLGITT, a citizen of the United States, residing at Ludington, in the county of Mason, State of Michigan, have invented certain new and useful Improvements in Bicycles, of which the following is a specification, reference being had therein to the accompanying drawings.

This invention relates to certain new and useful improvements in bicycles, and more especially to that class of bicycles known as "Safeties;" and it has for its objects, among others, to produce an improved, cheap, yet durable, machine of this character, consisting of few parts, and those arranged to be operated by hand both for propelling the machine and for steering the same. A rest is provided for the feet of the operator, and there are no pedals to catch his feet or clothing.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a side elevation of my improved bicycle with the wheels removed and shown in dotted outline. Fig. 2 is a top plan of the steering and operating lever and connections. Fig. 3 is a modified form of steering device in perspective.

Like letters of reference indicate like parts in all the views where they occur.

Referring now to the details of the drawings by letter, A designates the frame, which, as shown, comprises the midway horizontal portion $a$, the rearwardly-extending substantially-vertical portion $a'$, which unites at the upper end with the forwardly-inclined portion $a^2$, and from the forward end of the horizontal portion extends the curved portion $a^3$, which terminates in the vertical portion $a^4$.

B is the rear wheel, carried by a suitable shaft or axle journaled in the lower end of the portions $a^2$, and on this shaft or axle is the sprocket-wheel C.

D is a mud-guard for the rear wheel. It may be of any suitable form of construction and is secured to the portion $a'$ of the frame.

E is the brake. It is of peculiar form, being pivoted, as at $e$, to the horizontal portion of the frame, with its rear portion extended downward from its pivot and arranged to bear against the periphery of the wheel, as shown in Fig. 1. Forward of its pivot it extends downward and thence upward and at its upper end carries or is formed with a head or enlarged portion $e'$, a suitable spring E' being provided, as shown, to normally hold the brake away from the wheel.

Rising from the horizontal portion of the frame is a foot-rest F, which is held adjustably in the pillar or upright F', as seen in Fig. 1, being designed to be held in its adjusted position by a set-screw or other analogous means $e^2$.

The seat G is supported on the frame in any suitable manner. It may be of any known construction.

Journaled in suitable bearings or hangers from the frame is the shaft or axle H, on which is secured the large sprocket-wheel H', over which and over the sprocket-wheel C passes the endless chain H² in the usual manner. On the ends of this shaft are the oppositely-arranged cranks H³, which are designed to be operated in a manner hereinafter described.

I is the front fork, of usual construction and carrying the front wheel I'. I² is the mud-guard for the front wheel. This fork is swiveled in bearings $i$ on the front side of the portion $a^4$ of the frame A and at its upper end carries a small sprocket-wheel J.

Extending rearwardly from the front portion $a^4$ of the frame A is a horizontal bar K, which at its rear end is enlarged, as seen at $k$, and in this rear end is pivotally journaled a short vertical shaft K', which carries a large sprocket-wheel K², which is connected with the wheel J by the endless chain K³. Connected with this sprocket-wheel K² so as to move therewith is the cross-bar L, from the ends of which rise the substantially vertical guide-arms L', which should preferably be slightly curved, as seen in Fig. 1, to allow of free movement of the operating-lever, hereinafter described. Movement of this bar by the upright portions or by the operating-lever serves to guide the machine in the desired direction.

M is a lever fulcrumed at $m$ between the bifurcations of the upper end of the vertical portion $a^4$ of the the frame A and at its rear end pivotally connected with the operating-lever N at its center. This operating-lever is provided with handles N' and near each end with a hole $n$ for the passage of the uprights or guide-arms L', as seen in both views. At the forward end of the lever M is pivotally connected the connecting-rod O, the other end of which is pivotally connected with the end of one of the cranks $H^3$, and at an equal distance to the other side of the pivot of the lever M is pivotally connected the connecting-rod P, the other end of which is connected pivotally with the end of the other crank. The connecting-rod O is necessarily curved, as shown in Fig. 1, to bring its rear end in proper position to operate the crank.

With the parts thus constructed the operation is as follows: In order to propel the vehicle, all that is necessary to do is to operate the operating-lever N up and down, it being guided in its movements by the guide-arms L'. The up-and-down movement of this lever turns the cranks $H^3$, as will be readily understood, and gives motion to the wheel in the usual manner. When it is desired to change the course of the wheel, it can be readily done by turning the rear sprocket-wheel on its pivot in the desired direction, so as to turn the front fork in its bearings.

In Fig. 3 I have shown a modified form of steering mechanism, in which the lever M is pivoted or fulcrumed at $m$ to the upper end of the vertical portion $a^4$ of the frame, as before, and is designed to be connected with the rods O and P, as in the form shown in Figs. 1 and 2. The cross-bar N is provided with handles N' and has the rear end of the lever M pivoted centrally thereto, the ends of the said cross-bar being pivotally connected by the rods $P^2$ with the cross-rod $P^3$ on the upper end of the fork.

The machine is propelled by the up-and-down motion of the parts, as in the other form, and the steering by the lateral movement, the only difference being in the details of construction.

What I claim as new is—

1. In a bicycle, the combination, with the frame and swiveled front fork, of a hand-operated propelling mechanism, and a sprocket-chain-steering device, and an operating-lever common to both, as set forth.

2. In a bicycle, the combination, with the frame and swiveled front fork, of a lever fulcrumed on the frame and connected with the cranks and a vertically-movable operating-lever connected with said lever, as set forth.

3. In a bicycle, the combination, with the frame and front fork, of the lever fulcrumed on the frame, the cranks, sprocket chain and wheels, the rods connecting the lever upon opposite sides of its pivot with the cranks, the operating-lever connected with the said lever, and guides for the operating-lever, as set forth.

4. In a bicycle, the combination, with the frame and the rearwardly-extending bar, of the sprocket-wheel pivotally supported in said bar, the bar connected to the said wheel and having uprights, the fulcrumed lever connected with the cranks, and the operating-lever connected therewith and having handles and guided by the said uprights, as set forth.

5. In a bicycle, the combination, with the frame and swiveled front fork, of hand-operated propelling and sprocket-chain-steering mechanism and connections therebetween, whereby while both are operated from the same lever either may be actuated independently of the other, as set forth.

In testimony whereof I affix my signature in presence of two witnesses.

GUSTAV ZILLGITT.

Witnesses:
B. BUENNING,
G. H. BLODGETT.